US007007899B1

(12) United States Patent
Bachman (10) Patent No.: US 7,007,899 B1
(45) Date of Patent: Mar. 7, 2006

(54) UTILITY LINE HANGER APPARATUS

(76) Inventor: Dan R. Bachman, 6314 Colburn Culver Rd., Sandpoint, ID (US) 83864

( * ) Notice: Subject to any disclaimer, the term of this patent is extended or adjusted under 35 U.S.C. 154(b) by 0 days.

(21) Appl. No.: 10/619,209

(22) Filed: Jul. 14, 2003

Related U.S. Application Data (60) Provisional application No. 60/403,013, filed on Aug. 13, 2002.

(51) Int. Cl.
*F16L 3/00* (2006.01)

(52) U.S. Cl. ........................................ 248/49; 248/74.1

(58) Field of Classification Search .............. 248/68.1, 248/74.1, 74.4, 65, 49, 63, 62, 316.5, 229.15, 248/229.23, 228.4, 230.4, 231.51; 24/277, 24/270, 273, 285, 276; 403/43, 289, 290, 403/291
See application file for complete search history.

(56) References Cited

U.S. PATENT DOCUMENTS

| 1,760,458 A | * | 5/1930 | Weber ........................ 248/74.1 |
| 1,784,244 A | | 12/1930 | Morris |
| 1,883,935 A | * | 10/1932 | Kelley .......................... 248/62 |
| 2,338,660 A | | 1/1944 | Morehouse |
| 2,423,222 A | | 7/1947 | Berry |
| 2,466,247 A | * | 4/1949 | Land ........................... 248/62 |
| 3,554,475 A | | 1/1971 | Benno |
| 4,445,255 A | * | 5/1984 | Olejak ......................... 24/284 |
| 4,557,447 A | * | 12/1985 | Combe ...................... 248/74.1 |
| 4,793,578 A | * | 12/1988 | Howard ........................ 248/62 |
| 5,303,574 A | * | 4/1994 | Matossian et al. ............... 73/7 |
| 5,622,210 A | * | 4/1997 | Crisman et al. ............. 138/104 |
| 5,740,994 A | | 4/1998 | Laughlin |
| 5,779,198 A | | 7/1998 | Rutherford et al. |

* cited by examiner

*Primary Examiner*—Ramon O Ramirez
(74) *Attorney, Agent, or Firm*—Reidlaw, LLC; John S. Reid (57) ABSTRACT

A utility line hanger apparatus is described which includes a hanger body formed into a partially closed loop with opposed loop ends spaced adjacent one another to form an access opening where a gate is provided to engage the loop ends to selectively close the access opening. First and second mounting members are provided on the hanger body to facilitate attachment of the hanger to a support remote from the loop ends.

24 Claims, 9 Drawing Sheets

UTILITY LINE HANGER APPARATUS

CROSS REFERENCE TO RELATED APPLICATIONS

This application claims priority under 35 U.S.C. § 120 to U.S. Provisional Patent Application Ser. No. 60/403,013, filed Aug. 13, 2002 and entitled, "Temporary Cord and Lead Hanger", which is hereby incorporated by reference herein in its entirety.

FIELD OF THE INVENTION

The invention disclosed and claimed herein pertains to support for utility lines and more particularly to apparatus used to at least temporarily support lines and similar elongated members.

BACKGROUND

Many temporary and permanent lines, tubes, hoses, pipes, conduits and other elongated members, hereafter generally referred to as "utility lines," are used on construction sites and other areas with foot and vehicle traffic nearby. Such utility lines can create hazardous work situations by obstructing access or by creating tripping hazards.

Unprotected utility lines that are left lying on floors, ground or paved surfaces are at risk of becoming damaged from passing foot or vehicle traffic. Such damage can extend to surrounding areas or personnel, particularly if the damaged line exposes electrical conductors or leaks hazardous materials.

A solution to the above problem is to remove the utility lines from the floor or ground surface, or to protect the lines with some form of covering. Another alternative is to hang the lines along spaced hangers, or to clamp the lines to upright supports.

Hangers that loosely receive utility lines can also damage the lines by abrasion. For example, an electrical extension cord, threaded through hangers, can rub on the hangers and eventually loose protective insulation. Once the insulation wears through, conductors are exposed and serious fire and shock hazards result. Hangers or supports that include wear resistant surfaces also typically have an internal rigid metal frame that, when the wear surface eventually wears away, can abrade the utility line with dangerous results.

Clamps or other devices that hold the utility lines secure to upright or otherwise elevated supports can reduce the wear hazard, but only at the cost of limiting flexibility of use or access to connectors. Also, if used improperly, clamps can damage the utility line and create hazardous conditions.

What is needed then is a support that will achieve the benefits to be derived from similar prior art supports, but which avoids the shortcomings and detriments individually associated therewith.

SUMMARY

In one aspect, the present utility line hanger apparatus includes a hanger body that is formed into a partially closed loop that includes opposed loop ends spaced adjacent one another to form an access opening. A gate is engageable with the loop ends to selectively close the access opening. A first mounting member is provided on the hanger body remote from the loop ends, along with a second mounting member that is remote from the loop ends and spaced from the first mounting member. Support connectors are also provided on the first and second mounting members.

In another aspect, the present utility line hanger apparatus includes a hanger body formed into a partial loop, with loop ends spaced adjacent one another to form an access opening. A gate releasably connects the loop ends to selectively close the access opening. A mounting member is configured to secure the hanger body to a support. The hanger body also includes a swivel loop closer that is mounted thereon for pivotal movement. The swivel loop closer includes one of the loop ends.

In a further aspect, the present utility line hanger apparatus includes a hanger body that is formed into a partial loop and which includes loop ends that are spaced adjacent one another to form an access opening. A gate releasably connects the loop ends to selectively close the access opening. A first mounting member is provided on the hanger body and defines a first axis. A second mounting member is also mounted to the hanger body, but in spaced relation to the first mounting member and defines a second axis that is at least substantially parallel to the first axis.

The above and further aspects and embodiments of the present invention will now be described in detail with reference to the accompanying drawings which, taken along with the following detailed description and claims, disclose the best mode presently known for carrying out the present invention.

DETAILED DESCRIPTION

Figure 1:
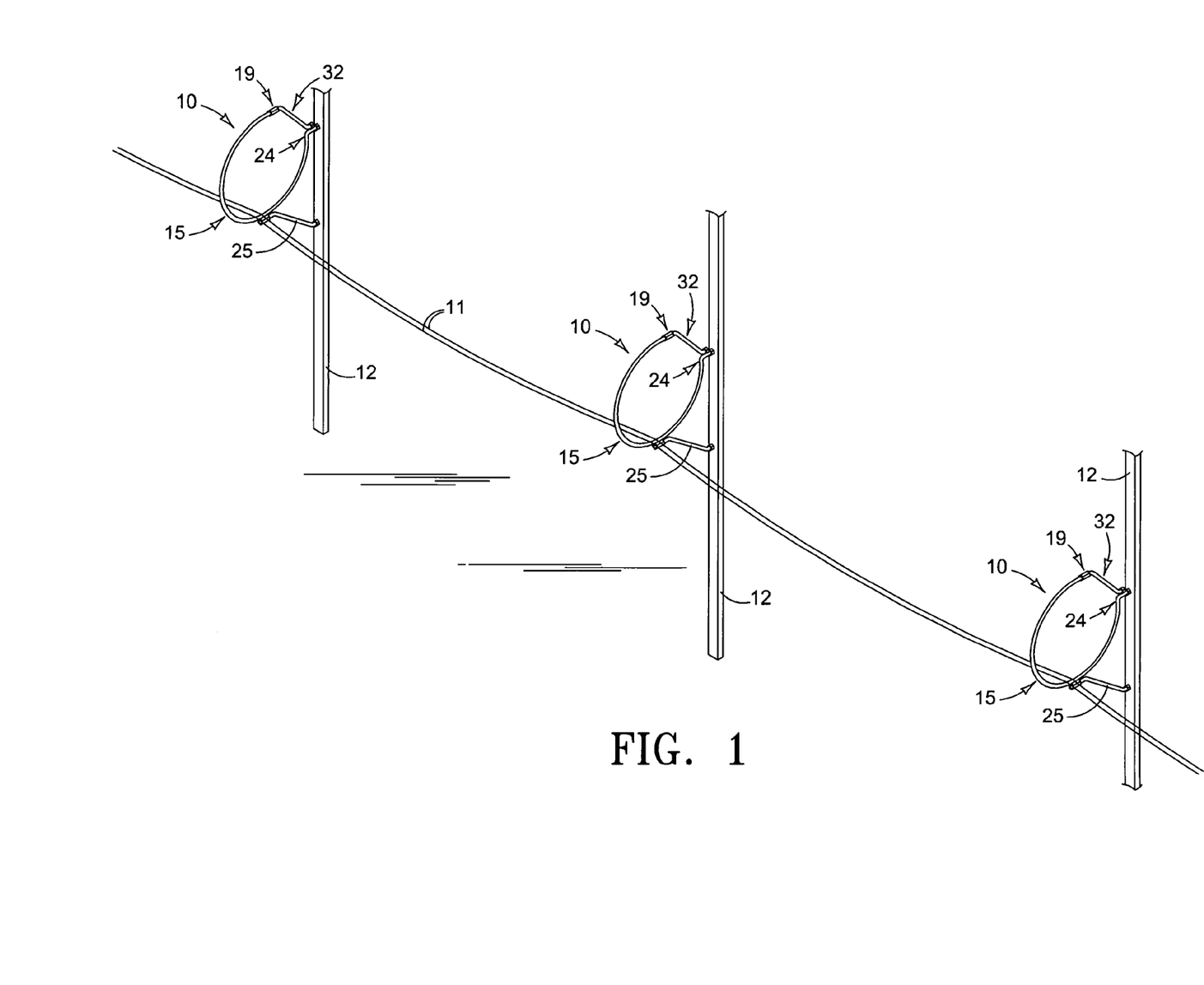
FIG. 1 is a perspective schematic view showing a plurality of the present utility line hanger apparatus mounted in elevated positions and receiving utility lines.

Referring now in greater detail to the drawings, attention is first drawn to FIG. 1 where a series of utility line hanger apparatus are shown, each being designated by the reference numeral 10. The apparatus 10 can be used singularly but will more frequently be used in groups to support an extent of one or more utility lines 11 above a ground or floor surface. In the illustration, the apparatus 10 are mounted to multiple upright supports 12. However, as can be seen in FIGS. 9–13, the apparatus 10 can be adapted for mounting to numerous other forms of supports, in nearly any angular orientation.

The illustrated utility line hanger apparatus 10 includes a hanger body 15 that is formed into a partially closed loop. In one aspect, the body is formed of a rigid material such as steel all-thread rods, bent into the configuration illustrated. Other rigid materials can also be used.

The body 15 can be formed in a circular configuration, or another appropriate partially closed loop shape, including polygonal, oval, or combinations thereof. The selected circular shape is beneficial because no sharp bends or corners are present in the region of the loop where utility lines 11 are to be supported, and so the loop will present a generally uniform curvature for loosely supporting one or more utility lines 11.

Figure 8:
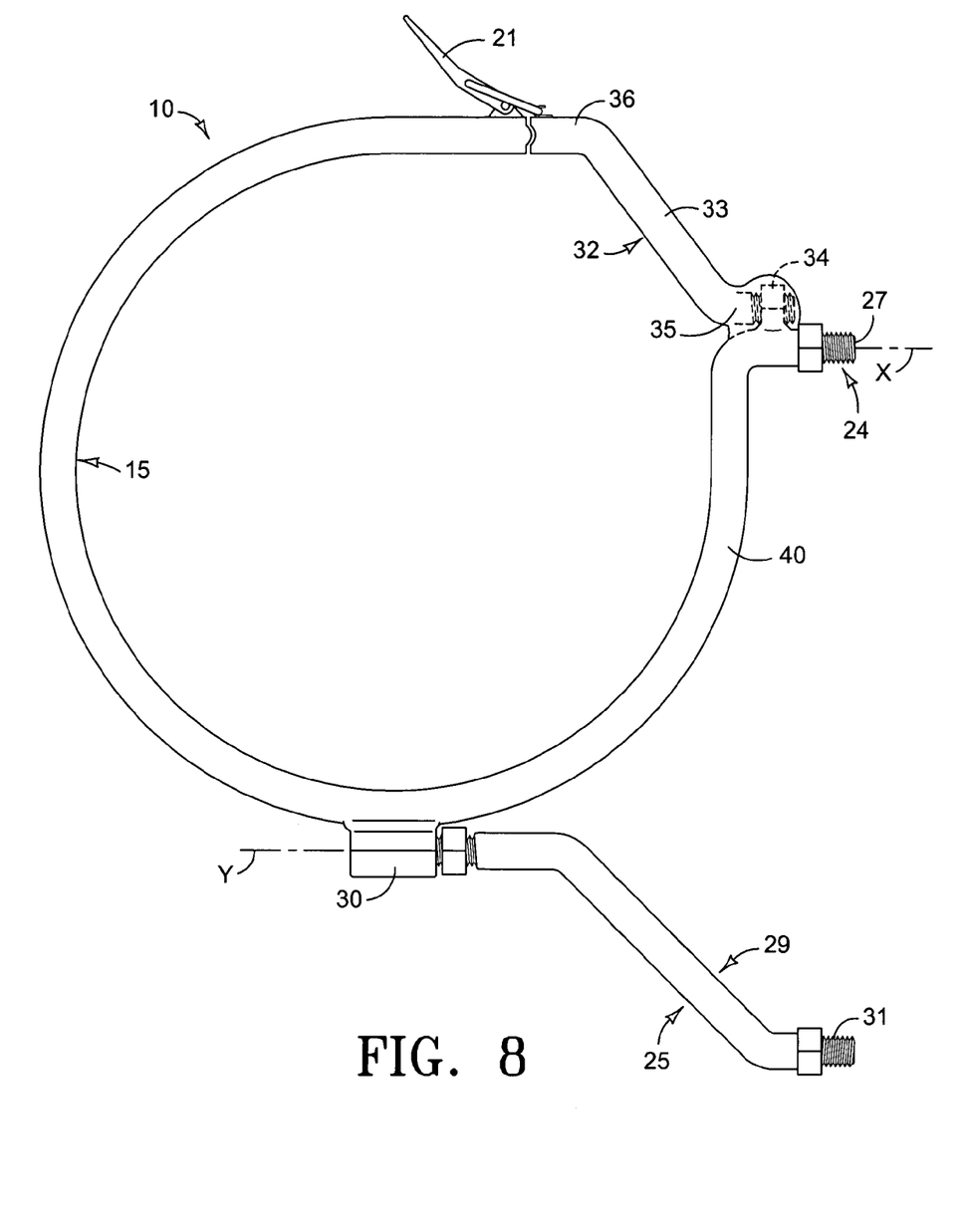
FIG. 8 is a view that is similar to FIG. 2 only showing an alternative gate arrangement.

The loop 15 as noted is partially closed, and includes opposed loop ends 16, 17 (FIGS. 4–7) that are spaced adjacent to one another, forming an access opening 18. A gate 19 is provided to selectively close the opening and complete the loop. In the aspect illustrated in FIGS. 1–7, the gate is shown as a nut 20 that threadably engages both loop ends 16, 17. Other forms of the gate 19 are envisioned, among which is an over-center clasp arrangement 21 shown in FIG. 8.

The two gate arrangements illustrated and described above are exemplary. Other fastener, clasp, clamp, or connector arrangements can also be used and are intended to fall within the scope of my invention.

The gate 19 is provided not only to selectively close the loop to prevent unintentional removal of utility lines, but also to add strength to the apparatus by binding the two ends 16, 17 together. This is an advantage especially in situations where multiple heavy utility lines 11 are to be carried. Additionally, the closed loop configuration forms a protective ring to prevent objects dropped from directly above and onto the apparatus, from pinching lines upon impact. The gate also allows selective inserting or removal of lines without requiring that they be threaded through successive loops.

Still further, the loop configuration allows lines to be systematically placed around and tied in a prescribed order to successive loops, using cable ties or tie wraps. This allows for easy removal without the problem of entanglement with other lines.

First and second mounting members 24, 25 can be provided on the body 15, in spaced relation to the loop ends, and to one another. Members 24, 25 assist in selectively securing the apparatus 10 to supports 12 as shown in FIG. 1 and others.

In one aspect, the first mounting member 24 is provided as an outwardly projecting stud 27 on the body 15. The illustrated stud 27 is integral with the hanger body 15, and defines an axis "X". The stud 27 functions as a support connector that facilitates mounting of the apparatus 10 directly to a support 12, or that enables selective attachment to a variety of clamp members 28 (FIGS. 9–12) which facilitate securing the apparatus to different supports 12.

The second mounting member 24, as depicted, is located on the body 15 in spaced relation to the loop ends 16, 17 and the first mounting member 24. The exemplary second mounting member defines another axis "Y" that, in the illustrated aspect, is at least substantially parallel to the axis X.

In the illustrated aspect, the second mounting member 25 is comprised of a swivel arm support 29 pivotably mounted to the hangar body 15 by way of a receptacle 30. In the illustrated version, the receptacle 30 is provided in the form of a threaded nut that is welded or otherwise affixed to the hangar body 15 to mount the swivel arm 29, and to define the second axis Y, which is also the swivel arm axis. If the receptacle 30 is provided as a threaded nut, the swivel arm support 29 will typically be similarly threaded to facilitate selective rotational adjustment of the support 29 about the swivel arm axis Y. In one variation on the apparatus 10 depicted in FIG. 2, the receptacle 30 is spaced-apart from the body 15 by a spacer. In one example the spacer is a metal member welded at one end to the body 15 and at the other end to the receptacle. In another example the spacer can be adjustable to provide greater flexibility to the range of mounting possibilities for the apparatus 10.

As depicted in various views of the drawings, the swivel arm 29 can be in the form of a bent rod which is mounted at one end to the receptacle 30, and extends to a remote end 31 that can be substantially parallel to the stud 27 and offset from the axis Y. The bent configuration allows for the end 31 to be adjustably positioned toward or away from the first mounting member 24.

The remote end 31, like the end of stud 27, can function as a support connector; enabling direct mounting to a support 12, or to one of a variety of intermediate clamp members 28 according to the nature of the support 12 to which the apparatus 10 is to be attached.

It is advantageous that the axes X and Y are at least substantially parallel so that the support connection points at the outward ends of stud 27 and swivel arm support 29 can be adjustably positioned toward or away from one another, yet remain in the same plane. This provision enables mounting of the apparatus 10 to different forms of supports. For example, note is taken of the I-beam flange attachment illustrated in FIG. 11. There, the swivel arm support 29 has been adjusted about axis Y to space the attached clamp member toward the first mounting member in order to accommodate the width of the I-beam flange. If a larger flange is encountered, the swivel arm support need only be pivoted outwardly about the axis Y to increase the distance between the first and second mounting members. The attached clamp member 28 will move away from the first mounting member 24 and attached clamp, to accommodate the wider flange. In either instance, the hangar body can remain in the same position with respect to the beam.

Figure 5:
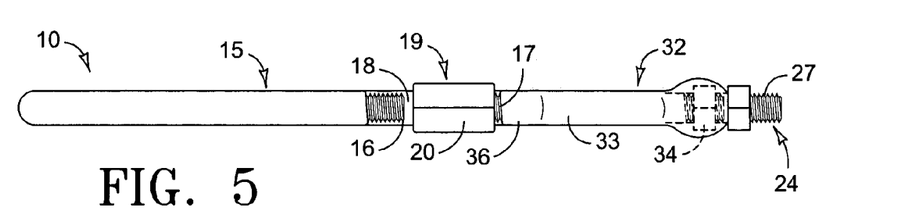
FIG. 5 is a top plan view similar to FIG. 3 only showing a gate arrangement in an open orientation.
Figure 6:
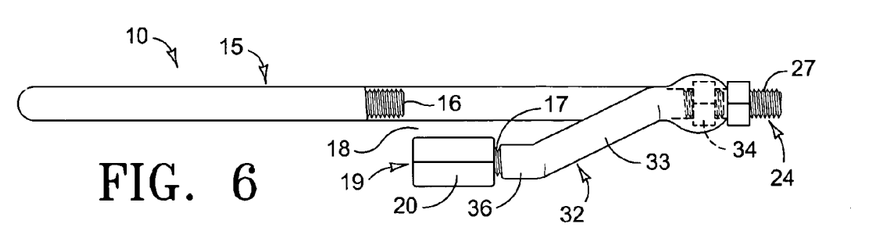
FIG. 6 is a top plan view similar to FIG. 5 only showing a more enlarged access opening through use of a swivel loop closer.
Figure 7:
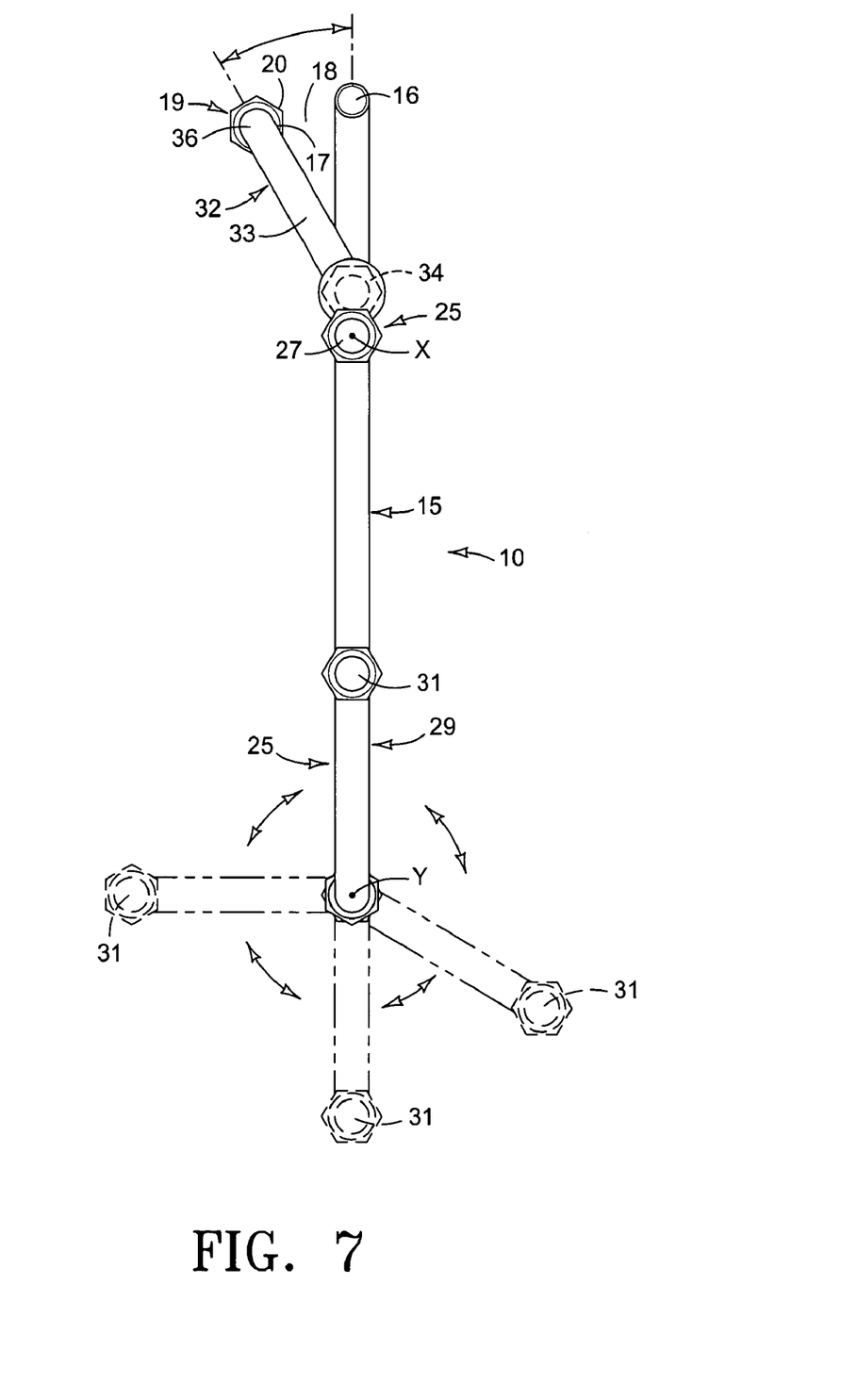
FIG. 7 is an operational plan view showing different pivoted positions of mounting members and the swivel loop closer.

Referring back again to the hanger body 15, aspects thereof can include a swivel loop closer 32, used to enhance the size of the access opening 18. FIG. 6 depicts the closer 32 in a position to maximize the opening size, while FIG. 5 shows the opening size without utilizing the adjustment capability allowed for by the closer configuration.

The depicted swivel loop closer (FIGS. 4–6) can be formed as a bent rod 33 movably attached to a receptacle 34 on the hanger body. In the illustrated form, the receptacle 34 is provided in the form of a nut that is welded or otherwise secured to the hangar body 15 to threadably receive an end 35 of the bent rod 33. As shown, the remaining end 36 of the bent rod 33 also defines the loop end 17, and has provisions for mounting the gate 19, or a mating part thereof. As depicted, the closer end 36 can threadably engage the gate nut 20.

It is noted that the hanger body 15, mounting members 24, 25; and the swivel loop closer can all be formed of threaded rod, typically referred to as "all thread". Such construction allows for use of threaded nuts as the receptacles 30, 34, and for the illustrated threaded loop ends 16, 17 to mount the gate 19. Alternatively, the various members can be provided without threads, or can be threaded or partially threaded to accommodate the receptacles. Other arrangements can also be used without departing from the scope of my invention.

Figure 14:
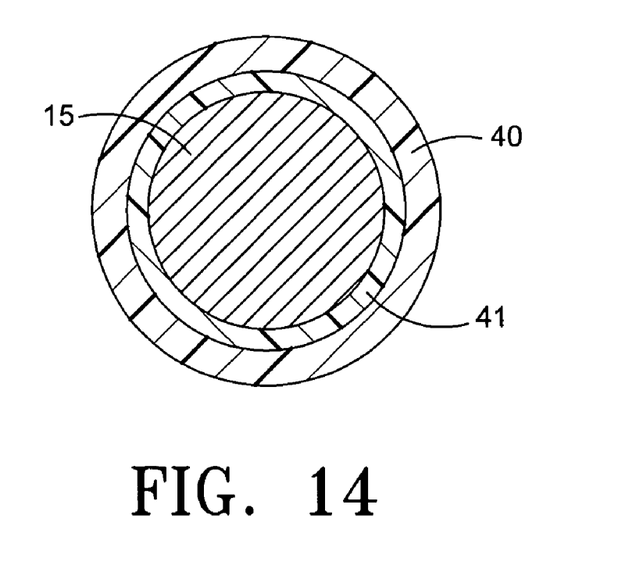
FIG. 14 is an enlarged sectional view, taken substantially along line 14—14 in FIG. 11, illustrating different wear coatings on the hanger body.

As depicted in FIG. 14, the hanger body 15 can be covered with a non-conductive and yieldable coating 40. In one aspect, the coating 40 is also resilient, at least in the vicinity of the receptacle 34 of the swivel loop closer 32. Such a coating can add a degree of resiliency to the swivel loop closer 32, biasing it toward the loop end 16 and the closed position of the gate 19. Thus, when a user desires to open the gate, the swivel loop closer can be forcefully pivoted to one side, increasing the size of the access opening 18. Then, when the user releases the swivel loop closer 32, the resilient material 40 in the vicinity of the nut 34 will cause the closer to pivot back toward the closed position.

FIG. 14 depicts the coating 40 over a color coded wear indicator material 41. Both materials can be similar, but the internal wear indicator material can be provided with a pigment that will color the material 41 differently than the wear resistant coating 40. Thus, when wear in the outer material 40 has occurred, the inner wear indicator layer 41 will become visible, indicating to the user that fresh wear resistant coating 40 should be applied, or that a new apparatus 10 should be employed. Both layers are advantageously electrically non-conductive.

An exemplary coating is "Performix®" brand dip coating made by Plasti Dip International at 3920 Pheasant Ridge Drive, Blaine Minn. 55449. The color coded layer can be applied in a first dip, and the outer wear layer 40 can be applied in one or more subsequent dips. The above material provides good wear resistant properties and functions as well to normally urge the swivel loop closer 32 toward the closed position.

Figure 9:
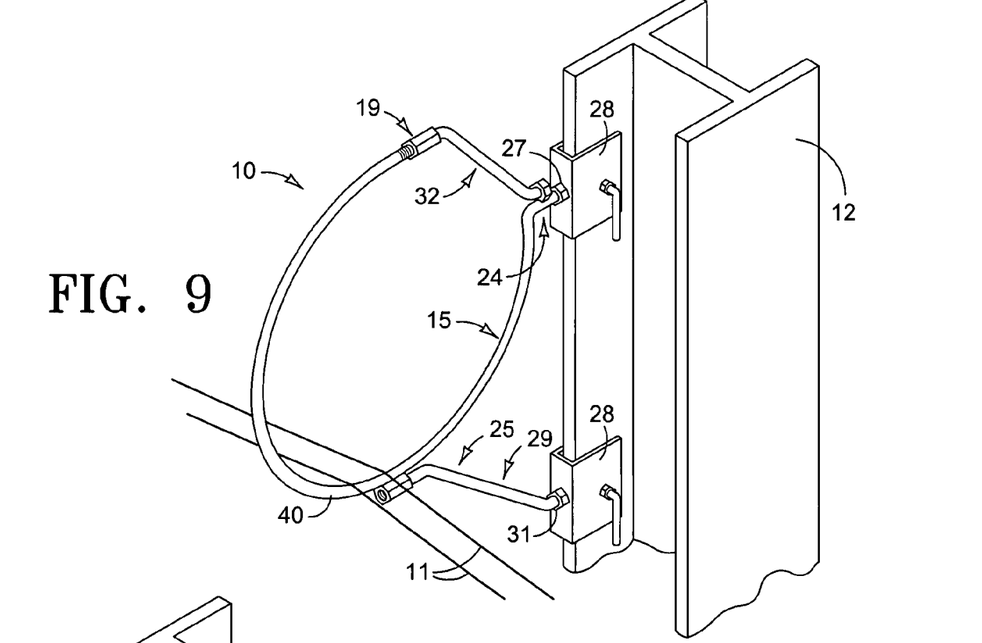
FIGS. 9–13 are views illustrating various mounting arrangements with respect to different forms of supports.
Figure 10:
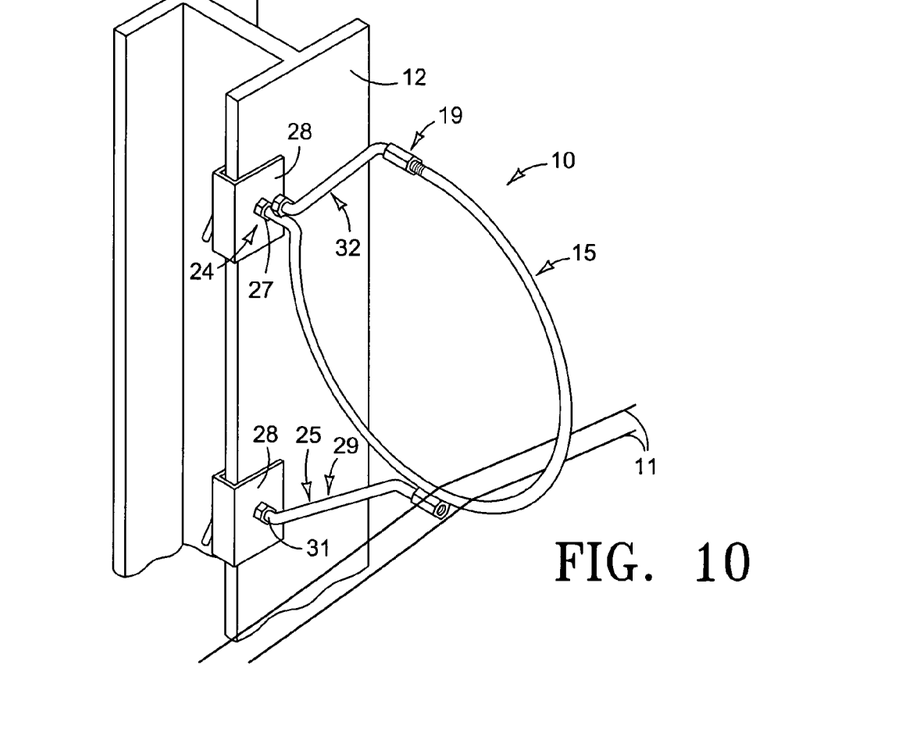
Figure 11:
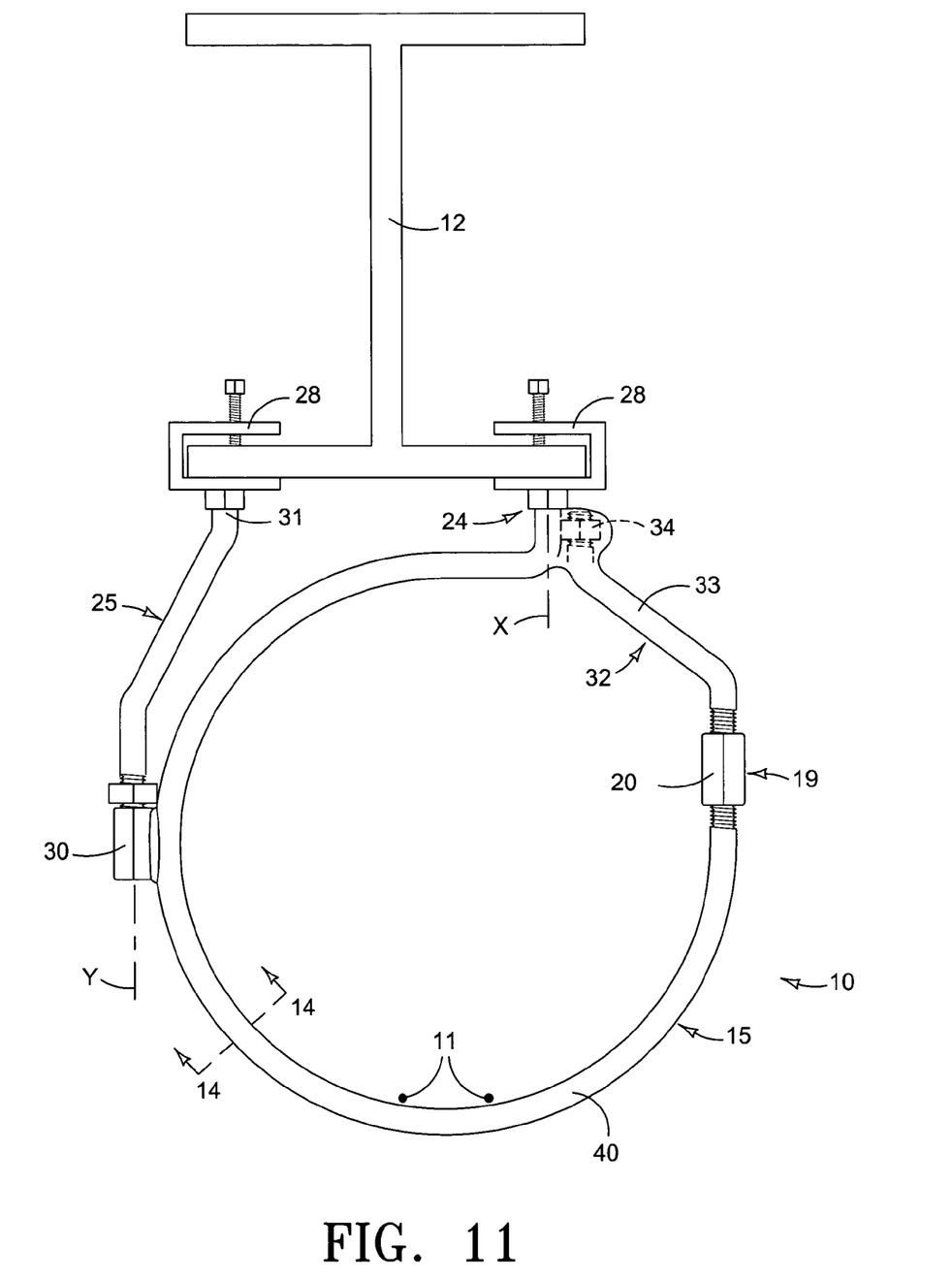

FIGS. 9–13 depict different arrangements by which the apparatus 10 can be mounted to various supports. In instances where the support is an I-beam or plate (FIGS. 9–11) the clamp members 28 can take the form of C shaped clamp bodies with thumb screws used to secure the clamps to the support. Threaded holes in the depicted clamp members enable mounting to the support connectors in various manners as depicted in FIGS. 9–11.

Figure 12:
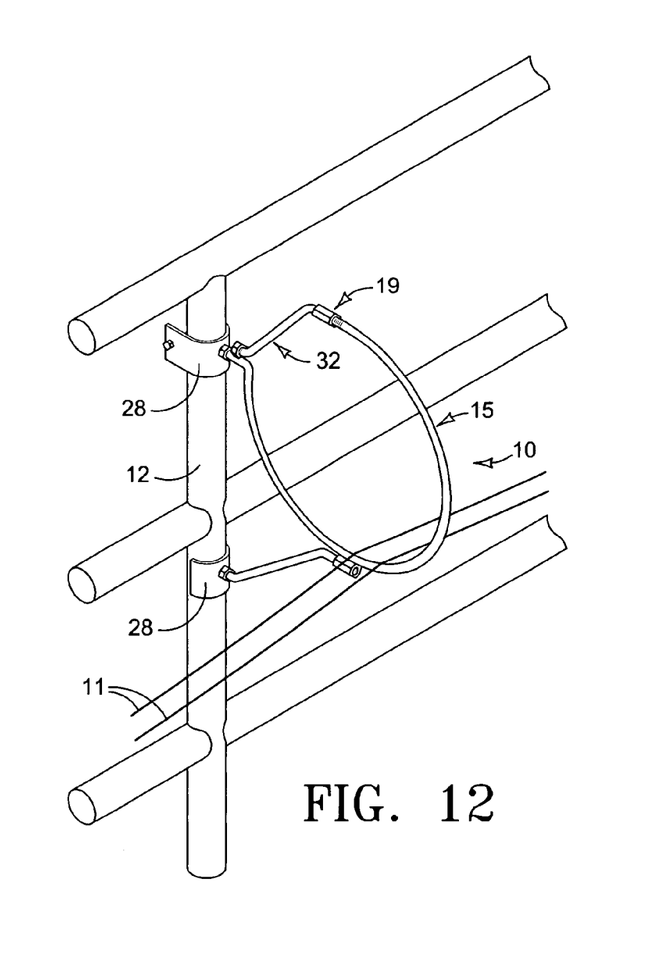
Figure 13:
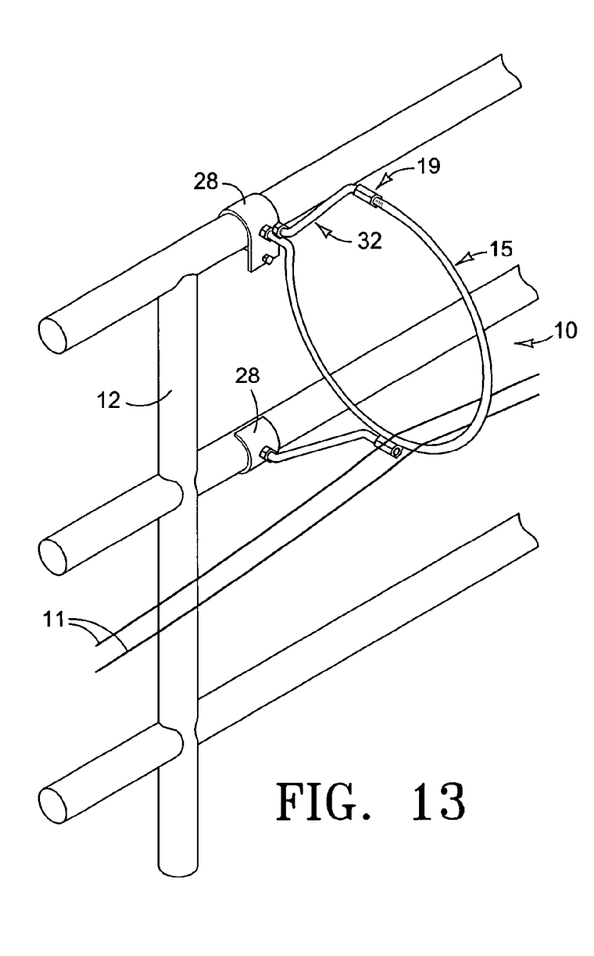

Other forms of the clamp members can also be used, as exemplified by the saddle and clevis or shackle arrangement shown in FIGS. 12 and 13. Even more clamp configurations can also be used, including more permanent forms, should it become desirable to use the apparatus in non-temporary installations. In such instances, the outer ends of the stud 27 and remote end 31 of the swivel arm support become the support connectors, which can be threaded, welded or attached by other means to the support or supports.

Operation of the apparatus is initiated after mounting it, and others if desired, to one or more supports. In the FIG. 1 example, several of the apparatus 10 are mounted to multiple supports 11 by way of the clamp members 28. Once the apparatus 10 are secure on the supports, the gates 19 can be successively opened, and sections of the utility line can be inserted through the access openings. The openings 18 can then be closed by allowing the swivel loop closer to swing back into alignment with the loop end 16, and the successive gates can be closed to secure the utility line or lines in place. The lines are now supported above the ground or floor surface, and out of harm's way. If the lines move while supported within the hanger bodies 15 and wear takes place over time, the internal color coding will eventually appear to warn the user that further coating should be applied or that the worn apparatus should be replaced.

Figure 15:
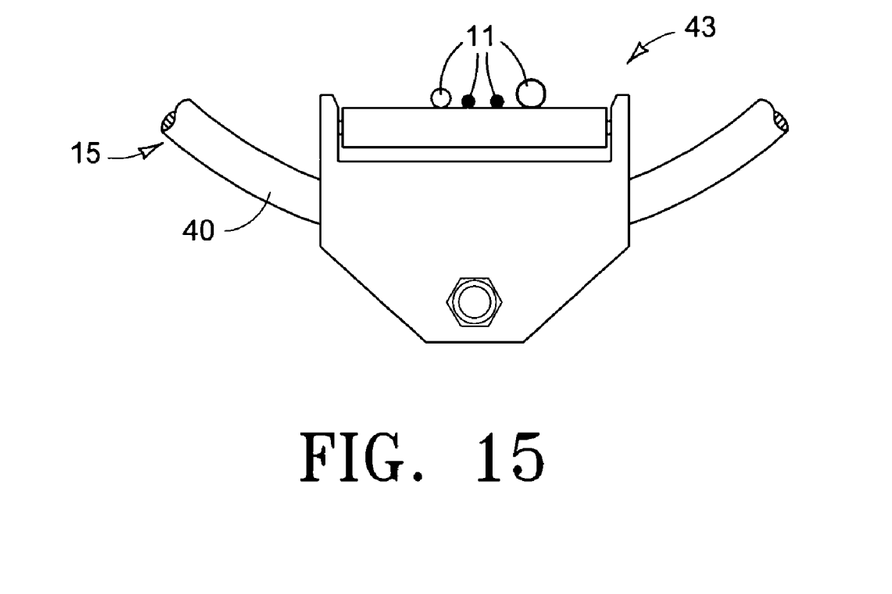
FIG. 15 is a fragmented view illustrating an auxiliary guide mounted to the hanger body.

As an alternative or supplement to the wear coating 40, an auxiliary guide 43 (FIG. 15) can be attached to the hanger body 15. The guide 43 can include a roller or other low friction support that will easily allow movement of the utility line or lines inside the confines of the loop.

Figure 2:
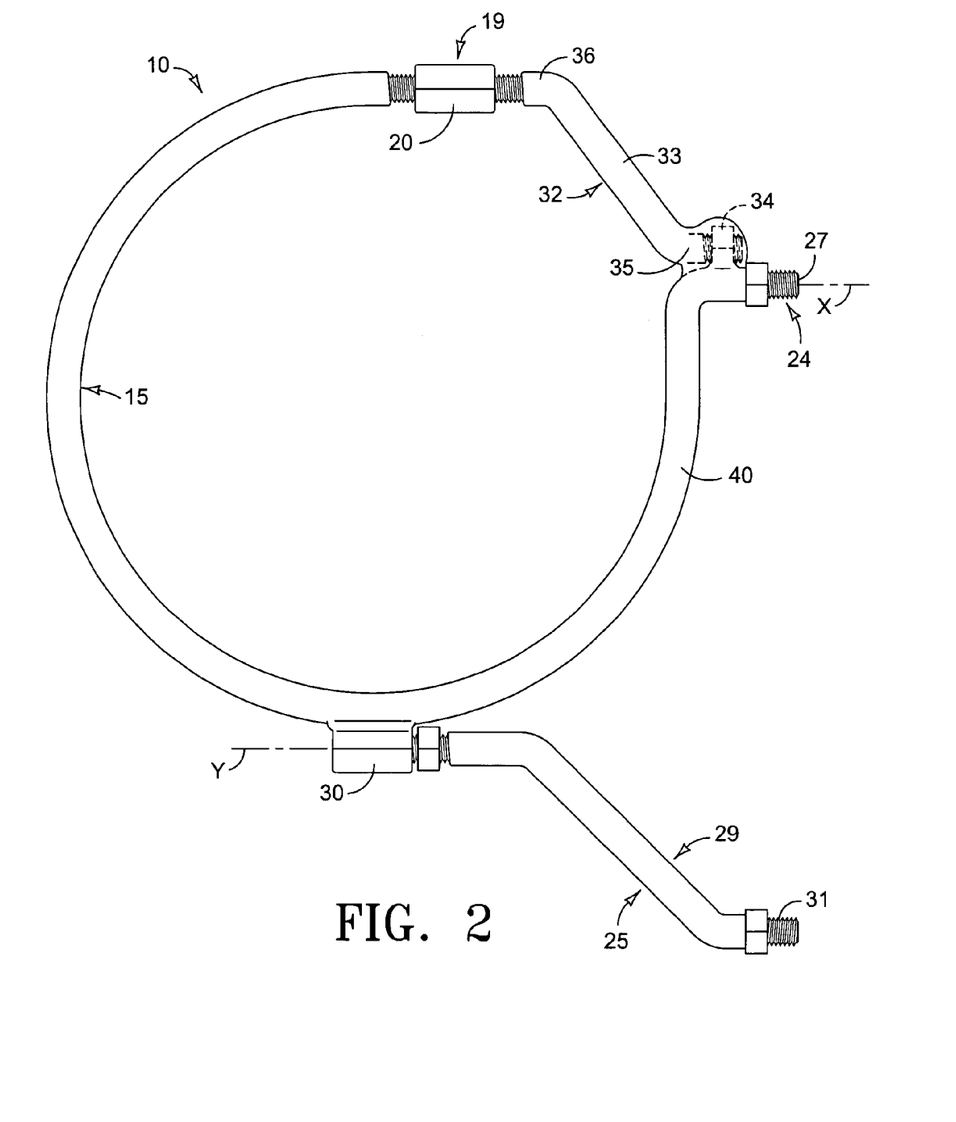
FIG. 2 is a side elevation view of an exemplary hanger apparatus.
Figure 3:
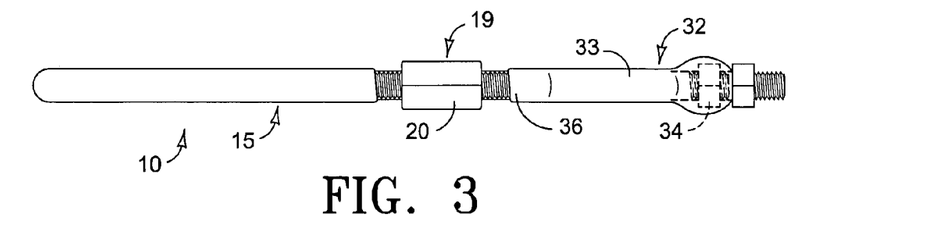
FIG. 3 is a top plan view as seen from above in FIG. 2.
Figure 4:
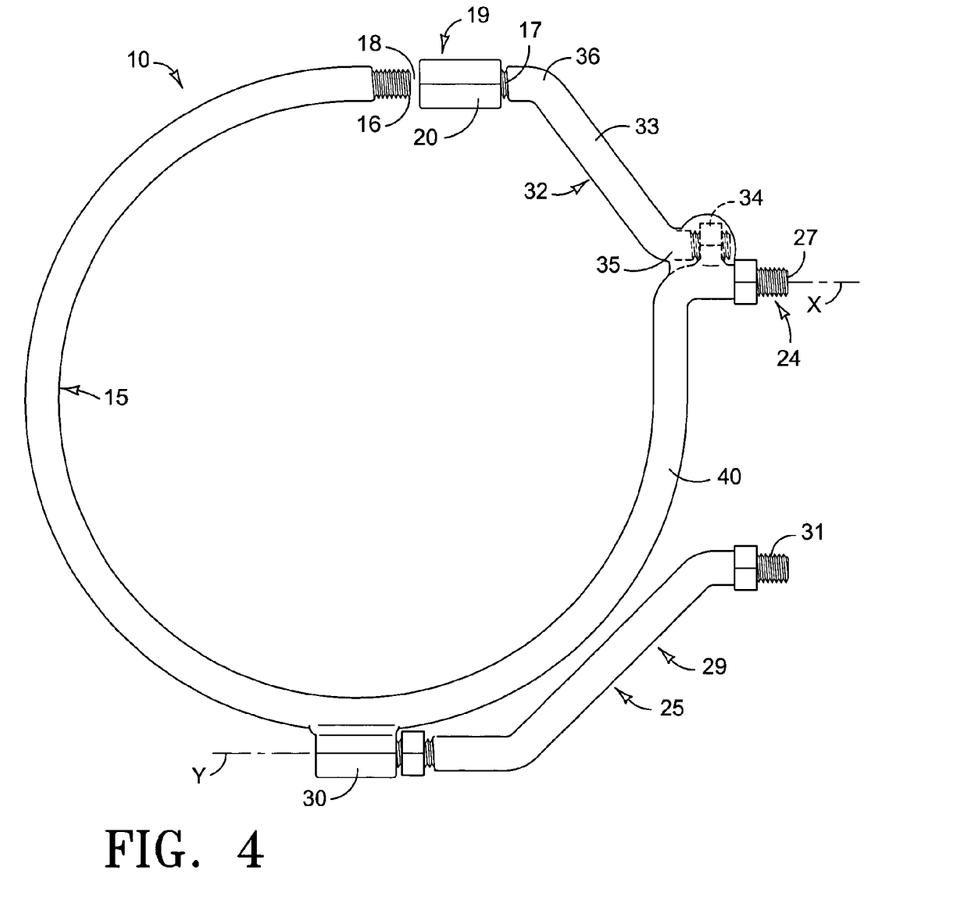
FIG. 4 is a view similar to FIG. 2 only showing a different adjusted position of a swivel arm support.

In one variation one or both of the mounting members 24, 25, or more specifically, one or both of the stud 27 or the remote end 31 (as depicted in FIG. 2) can be supported by, or defined on, an extensible mounting member to allow out-of-plane orientation of the stud 27 and remote end 31 with respect to one another. This provides additional flexibility for mounting the apparatus 10 in differing angular orientations with respect to the attached support 12.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A utility line hanger apparatus, comprising:
a hanger body formed into a partially closed loop that includes opposed loop ends spaced adjacent one another to form an access opening;
a gate engageable with the loop ends to selectively close the access opening;
a first mounting member on the hanger body remote from the loop ends;
a second mounting member on the hanger body remote from the loop ends and spaced from the first mounting member;
support connectors on the first and second mounting members; and
wherein the second mounting member is comprised of a swivel arm support rotatable mounted to the hanger body by way of a receptacle affixed to the hanger body.

2. The apparatus of claim 1, wherein the hanger body includes a swivel loop closer mounted thereon for pivotal movement; and
wherein the swivel loop closer includes one of the loop ends.

3. The apparatus of claim 1, wherein the second mounting member is pivotable about an axis toward and away from the first mounting member.

4. The apparatus of claim 1, wherein the second mounting member is pivotable about an axis toward and away from the first mounting member;
the hanger body includes a swivel loop closer mounted thereon for pivotal movement; and
the swivel loop closer defines one of the loop ends.

5. The apparatus of claim 1, wherein the loop ends are threaded and wherein the gate is comprised of a nut threadably engageable with both loop ends.

6. The apparatus of claim 1, and further comprising an electrically non-conductive yieldable coating on the hanger body.

7. The apparatus of claim 1, and further comprising a visually distinctive wear indicator coating on the hanger body, at least partially covered by an electrically non-conductive yieldable coating.

8. The apparatus of claim 1, wherein the hanger body is formed of a threaded rod.

9. The apparatus of claim 1, and further comprising an auxiliary guide releasably mountable to the hanger body.

10. The apparatus of claim 1, and further comprising a spacer mounted between the hanger body and second mounting member, spacing the second mounting member away from the hanger body.

11. The apparatus of claim 1, and further comprising an adjustable spacer mounted between the hanger body and second mounting member, adjustably spacing the second mounting member from the hanger body.

12. The apparatus of claim 1, and further comprising an extension releasably mountable to one of the first and second mounting members.

13. The apparatus of claim 1, wherein the hanger body, the first mounting member, and the second mounting member are formed of threaded rod.

14. The apparatus of claim 1, wherein the hanger body includes a swivel loop closer formed of a bent rod threadably engaged with a nut secured to the hanger body, and wherein the swivel loop closer defines one of the loop ends that is pivotable, about an axis defined by the nut, toward and away from a remaining one of the loop ends.

15. The apparatus of claim 1, wherein the hanger body includes a swivel loop closer formed of a bent rod pivotably engaged with a receptacle secured to the hanger body, and wherein the swivel loop closer defines one of the loop ends.

16. The apparatus of claim 1, wherein the hanger body includes a swivel loop closer formed of a bent rod threadably engaged with a nut secured to the hanger body, and wherein the swivel loop closer includes one of the loop ends;

the one loop end is pivotable, about an axis defined by the nut, toward and away from the remaining loop end, thereby adjustably varying the access opening size; and the nut and adjacent portions of the bent threaded rod and hanger body are encased in a resilient material that yieldably holds the one loop end normally in close proximity to a remaining one of the loop ends.

17. The apparatus of claim 1, wherein the second mounting member is comprised of a swivel arm support rotatably mounted at one end to the hanger body for rotation about a swivel arm axis, and defining a remote end that is offset from the swivel arm axis.

18. The apparatus of claim 1, wherein the first mounting member is comprised of a stud projecting from the hanger body, and wherein the second mounting member is defined by a swivel arm with a remote end that is substantially parallel to and offset from the threaded stud.

19. The apparatus of claim 1, and further comprising clamp members releasably mounted to the first and second mounting members.

20. A utility line hanger apparatus, comprising:

a hanger body formed as a partial loop and including loop ends spaced adjacent one another to form an access opening;

a gate releasably connecting the loop ends to selectively close the access opening;

a mounting member configured to secure the hanger body to a support;

wherein the hanger body includes a swivel loop closer mounted thereon for pivotal movement;

the swivel loop closer includes one of the loop ends; and wherein the second mounting member is comprised of a swivel arm support rotatable mounted to the hanger body by way of a receptacle affixed to the hanger body.

21. The apparatus of claim 20, wherein the swivel loop closer is at least partially encased in a resilient material, yieldably biasing the swivel loop closer to a normally closed position wherein the one loop end is disposed adjacent a remaining one of the loop ends.

22. The apparatus of claim 20, wherein the hanger body is at least partially coated with a color coded wear indicator material, and wherein the wear indicator is at least partially covered by a wear resistant coating.

23. A utility line hanger apparatus, comprising:

a hanger body formed into a partial loop and including loop ends spaced adjacent one another to form an access opening;

a gate releasably connecting the loop ends to selectively close the access opening;

a first mounting member on the hanger body and defining a first axis;

a second mounting member mounted to the hanger body in spaced relation to the first mounting member and defining a second axis that is at least substantially parallel to the first axis; and wherein the second mounting member is comprised of a swivel arm support rotatable mounted to the hanger body by way of a receptacle affixed to the hanger body.

24. The apparatus of claim 23, wherein the second mounting member is bent in such a manner that an end thereof is centered on the second axis and a remaining end is spatially offset from the second axis.

* * * * *